US012709534B1

(12) United States Patent
Moschetti et al.

(10) Patent No.: US 12,709,534 B1
(45) Date of Patent: Aug. 18, 2026

(54) APPARATUS, METHOD, AND SYSTEM FOR ELECTRONIC ALCOHOL TAPS

(71) Applicant: Persistent Engineering Ltd., Lakewood, CO (US)

(72) Inventors: Peter Moschetti, Montgomery Village, MD (US); Zachary Paul Masciopinto, Denver, CO (US); Benjamin Overholt, Arvada, CO (US); Maya Moschetti, Montgomery Village, MD (US)

(73) Assignee: Persistent Engineering Ltd., Lakewood, CO (US)

( * ) Notice: Subject to any disclaimer, the term of this patent is extended or adjusted under 35 U.S.C. 154(b) by 145 days.

(21) Appl. No.: 18/735,916

(22) Filed: Jun. 6, 2024

Related U.S. Application Data

(60) Provisional application No. 63/506,809, filed on Jun. 7, 2023.

(51) Int. Cl.
*B67D 1/14* (2006.01)
*B67D 1/08* (2006.01)

(52) U.S. Cl.
CPC ......... *B67D 1/1405* (2013.01); *B67D 1/0888* (2013.01); *B67D 2001/1483* (2013.01)

(58) Field of Classification Search
CPC ................ B67D 1/1405; B67D 1/0888; B67D 2001/1483; B67D 2210/0006; B67D 1/122; B67D 2001/082; B67D 1/0046; B67D 1/0878; B67D 1/1211; B67D 1/0037; B67D 1/108; B67D 1/0855; B67D 1/0889; B67D 1/0891; B67D 1/0892
USPC ........................................................ 222/1, 61
See application file for complete search history.

(56) References Cited

U.S. PATENT DOCUMENTS

| | | | | |
|---|---|---|---|---|
| 8,857,666 | B2 * | 10/2014 | O'Keefe, Jr. | B67D 1/0885 222/37 |
| 10,683,198 | B2 * | 6/2020 | Kelly | B67D 1/0079 |
| 11,993,504 | B2 * | 5/2024 | Carson | B67D 1/0021 |
| 2023/0257248 | A1 * | 8/2023 | Danielson | B67D 1/122 222/61 |

* cited by examiner

*Primary Examiner* — David J Walczak
(74) *Attorney, Agent, or Firm* — Husch Blackwell LLP

(57) ABSTRACT

An electronic, non-pneumatic, beverage dispenser. The electronic beverage dispenser uses a pump that has its intake in fluid communication with the bottom of a bottle and a discharge in fluid communication with a spout or spigot. A processor coupled to a graphical user interface receives a beverage selection from a user. The processor causes the pump associated with the selected beverage to pump the beverage out of the spout or spigot.

29 Claims, 8 Drawing Sheets

APPARATUS, METHOD, AND SYSTEM FOR ELECTRONIC ALCOHOL TAPS

CROSS-REFERENCE TO RELATED PATENT APPLICATIONS

The present application is related to and claims priority from U.S. Provisional Patent Application Ser. No. 63/506,809, filed Jun. 7, 2023, the disclosure of which is incorporated herein by reference as if set out in full.

BACKGROUND

The technology of the present application relates to beverage taps and, more particularly, electronic alcohol taps for wines, beers, and spirits without pneumatic pressure sources.

Alcoholic beverages have been available forever and are generally ubiquitous around the world. Some locations prefer beer, some locations prefer wine, and some locations prefer spirits. As long as there has been a desire for alcoholic beverages (generically alcohol or beverages), there has been a need to distribute quantities of the alcohol. Today, for example, beer is provided in metal kegs that are pressurized with a gas, such as air, carbon dioxide, or nitrogen, where a tap is provided. When the tap is operated, an operator opens the tap, which moves a valve from a closed position to an opened position, and beer is forced through a tube and out the tap into a container by the pressure head on the keg. Although less common than a beer keg, wines may be provided in a similar fashion. The wine is pressurized using a gas. A tap in fluid communication with the pressurized wine source allows wine to flow from the source to a container when the tap is open.

As can be appreciated, the gas pressurized tap is less than desirous. As the beverage is dispensed, the gas pressure decreases and eventually needs to be changed. Among other things, this means the tap is unavailable until the pressure source is replaced.

Also, in certain aspects, the gas pressurized taps are cumbersome. The fluid connections (liquid and gas) are often fixed and difficult to change to allow changes to combinations of beverages available. In the systems that do allow changes, the pressure source needs to be isolated, the system bleed of pressure, and repressurized once changed.

Thus, against this background, it would be desirable to provide an improved apparatuses, methods, and systems for beverage taps.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, an electronic beverage tap without a pneumatic source is provided. The electronic beverage tap includes, in some embodiments, a microprocessor operationally coupled to a graphical user interface, such as a touch screen, and a pump. The pump is in fluid communication with a beverage source, such as a bottle of wine, and a spigot that is attached to a placard. The spigot is arranged over a cup stand. In certain embodiments, one or more beverage holders may be coupled to the placard of the electronic beverage tap. In certain aspects the spigot includes an electronic valve operationally coupled to the microprocessor. The electronic beverage tap further includes a beverage fastener coupled to the beverage source that places the pump in fluid communication with the beverage. The beverage fastener includes a cap portion coupled to the beverage source, such as a bottle, an intake tube coupled to a bore in the cap portion and placing the pump intake and the beverage source in fluid communication through tubing.

In some aspects, the technology of the present application dispenses a beverage by operation of a fluid pump without using a pneumatic source. The electronic beverage tap is turned on to power the electronic beverage tap from a power source, such as a battery. A microprocessor causes a graphical user interface to display a menu of options for a consumer, user, or operator. The consumer selects, using an input device such as a touch screen, a beverage (and possibly an amount of the beverage). The microprocessor receives the selection from the input device, such as the touch screen, and causes the pump to operate for a predetermined time such that the selected beverage is dispensed into a container on the cup stand.

These and other aspects of the present system and method will be apparent after consideration of the Detailed Description and Figures herein.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to an electronic beverage tap. However, the technology described herein may be used with applications other than those specifically described herein. For example, the technology of the present application may be applicable to other beverages, such as beer and spirits, as well as other liquid dispensing systems, such as, for example, cleaners, non-alcoholic beverages, other fluids, combinations thereof, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

The technology of the present application provides for a partially self-contained electronic beverage tap, without the need for a gas pressure source. The self-contained electronic beverage tap may be configured for mounting on a wall or configured to stand on a counter, etc. in a plurality of locations. The self-contained unit includes, among other things, a placard, a graphical user interface (GUI), a beverage holder, a cup stand, a processor, and a pump. The pump is in fluid communication with a beverage container in the beverage holder and a spigot. The processor is operably coupled to the GUI and pump, and optionally the spigot. A consumer, operator, or the like, uses the graphical user interface to make an alcohol selection, which could be a type of alcohol or the available choices as well as an amount, such a 170 ml for a glass of wine or 550 ml for a pint of beer. The processor would receive a signal from the GUI and cause the pump to operate to cause the desired beverage and amount to be dispensed from the spigot to a cup placed in the cup stand. The processor is but one means for controlling the operation of the pump, and possibly one means for controlling the operation of the spigot valve. Similarly, the pump is one means for moving fluid from a beverage source to be poured out of the spigot.

Figure 1:
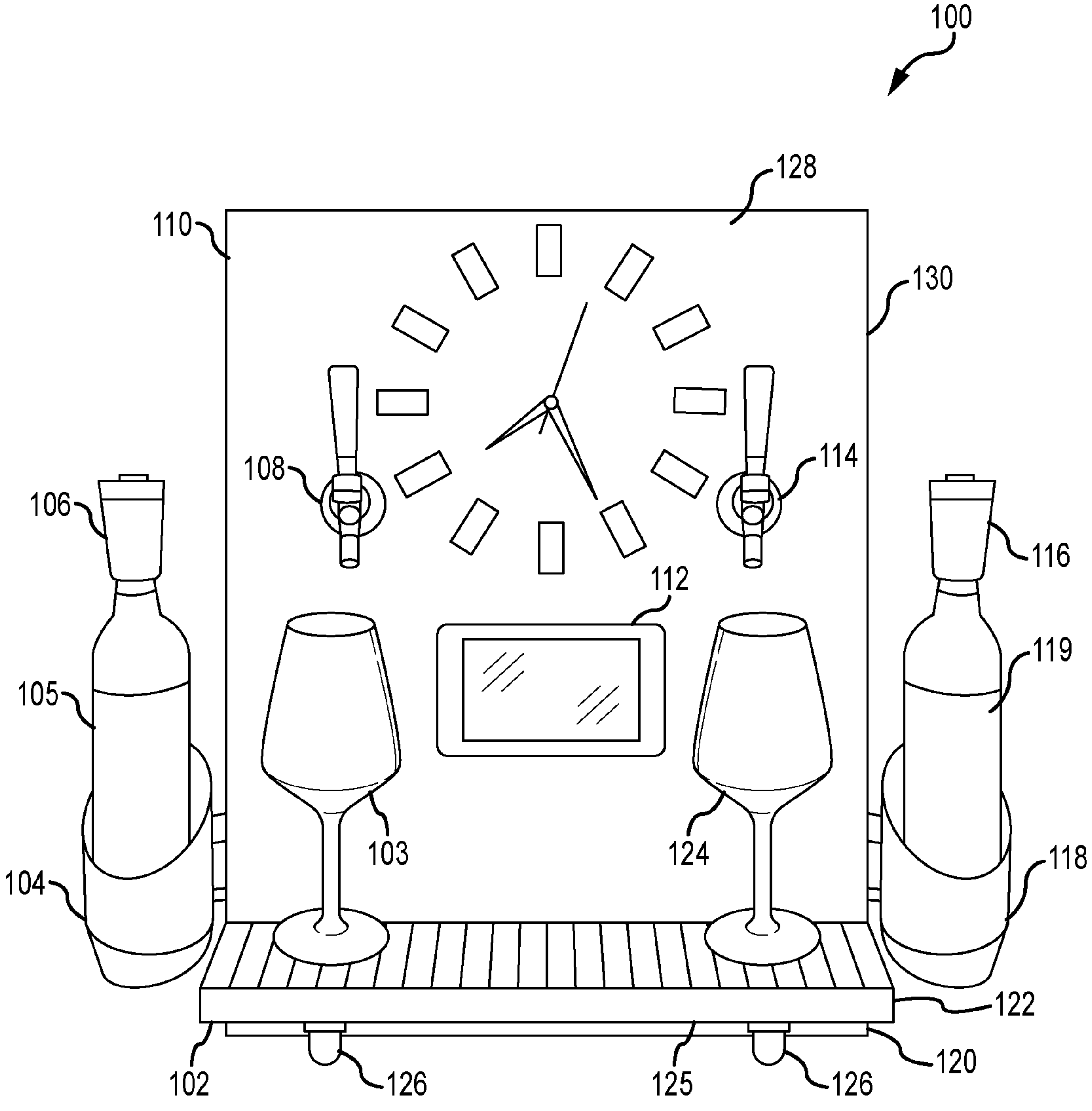
FIG. 1 is a front view of an electronic beverage (wine) tap consistent with the technology of the present application.
Figure 2:
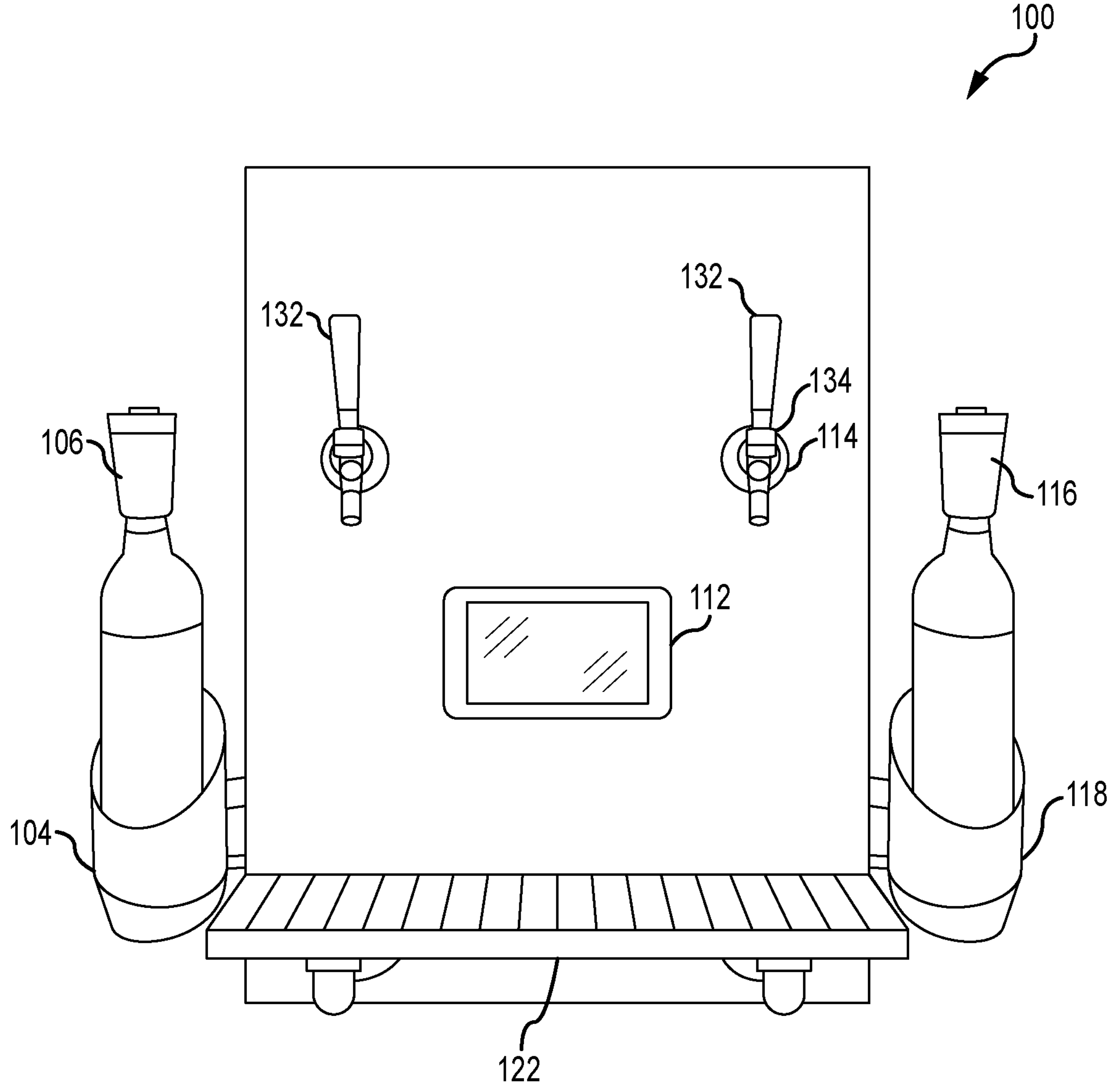
FIG. 2 is another front view of the electronic beverage (wine) tap consistent with the technology of the present application.

With reference now to FIG. 1, a front view of an electronic wine (beverage or alcohol) tap 100 is provided. The electronic wine tap 100 includes, in no particular order, a cup stand 102 (which is shown with a pair of wine glasses 103), a first beverage holder 104 (with a first bottle of wine 105 in the first beverage holder 104), a first beverage fastener 106, a first spigot 108, a placard 110, a GUI 112, a second spigot 114, a second beverage fastener 116, and a second beverage holder 118 (with a second bottle of wine 119 in the second beverage holder 118). As can now be appreciated, the electronic wine tap 100 may be provided with as few as one beverage holder or as many beverage holders as desired. While shown as coupled to the placard 110, the first and second beverage holders 104, 118 may be in separate from the placard 110, such as in a cart or tray below the electronic wine tap 100. The beverage holders 104, 118 do not need to be coupled to the placard as the beverage containers, in the beverage holders 104, 118 are in fluid communication with the spigots 108, 114.

The electronic wine tap 100 is shown where the placard 110 is configured to mount to a wall, similar to a wall mounted television. The wall mount may include, among other things, an arm to extend the placard from the wall and a pivot to allow the placard to pivot to allow the electronic interface to be moved to facilitate an operator's use of the electronic wine tap 100. In other embodiments, the electronic wine tap 100 may be provided with a base or stand (not specifically shown) that is perpendicular to the placard 110 and located at a base 120 of the placard 110. The base or stand would allow the electronic wine tap 100 to stand on countertop or table top.

The electronic wine tap 100 is further provided with a container stand 122. The container stand 122 is shown as a continuous unit but could be discontinuous. The container stand 122 provides a location to set a container, such as the wine glasses 124 shown, beneath the spigots 108, 114. As shown, the container stand 122 may be slotted to provide for spillage basin 125 that, optionally, has a drain 126 such that spillage drains to a disposal sump or the like. The container stand 122 may be provided only aligned with the spigots in certain embodiments. In other words, the container stand 122 would be a plurality of container stands 122 (or two in this instance) with a container stand 122 aligned under each spigot 108, 114, which may in fact be a single spigot or many more than the two spigots shown. In this case, a section of the container stand 122 between the spigots may removed.

Optionally, and as shown, the placard 110 has a display space 128 located on the top 130, about half, of the placard 110. As shown, the display space 128 is provided with a clock. Other displays may be provided, such as, for example, a mountain scape, college logos, sports logos, artwork, a digital display or television, or the like. The display space 128 is provided in this exemplary embodiment above the GUI 112, but in other embodiments, the GUI 112 may be placed in the top 130.

The spigots 108 and 114 shown appear as convention taps for aesthetics. A conventional tap has a lever 132 that is movable or pivotable between an open position (typically a forward pull) and a closed position (typically a backward push). The pivot of the lever 132 causes a ball valve 134 internal to the tap to move between an open flow position (forward pull) and a closed no-flow position (backwards push). In this exemplary embodiment, the spigots do not need to have valves. Rather they are open spigots in fluid communication with the beverage through a pump (described below). Operation of the pump causes the beverage to flow or not flow rather than the lever 132 and valve 134. In certain embodiments, the lever 132 may operate a ball valve to provide for no drippage when the pump is not operating. In still other embodiments, the microprocessor (described below) may cause an electronic valve 134 in the spigots to open and close or may cause the lever 132 to pivot via an electrical signal.

Figure 3:
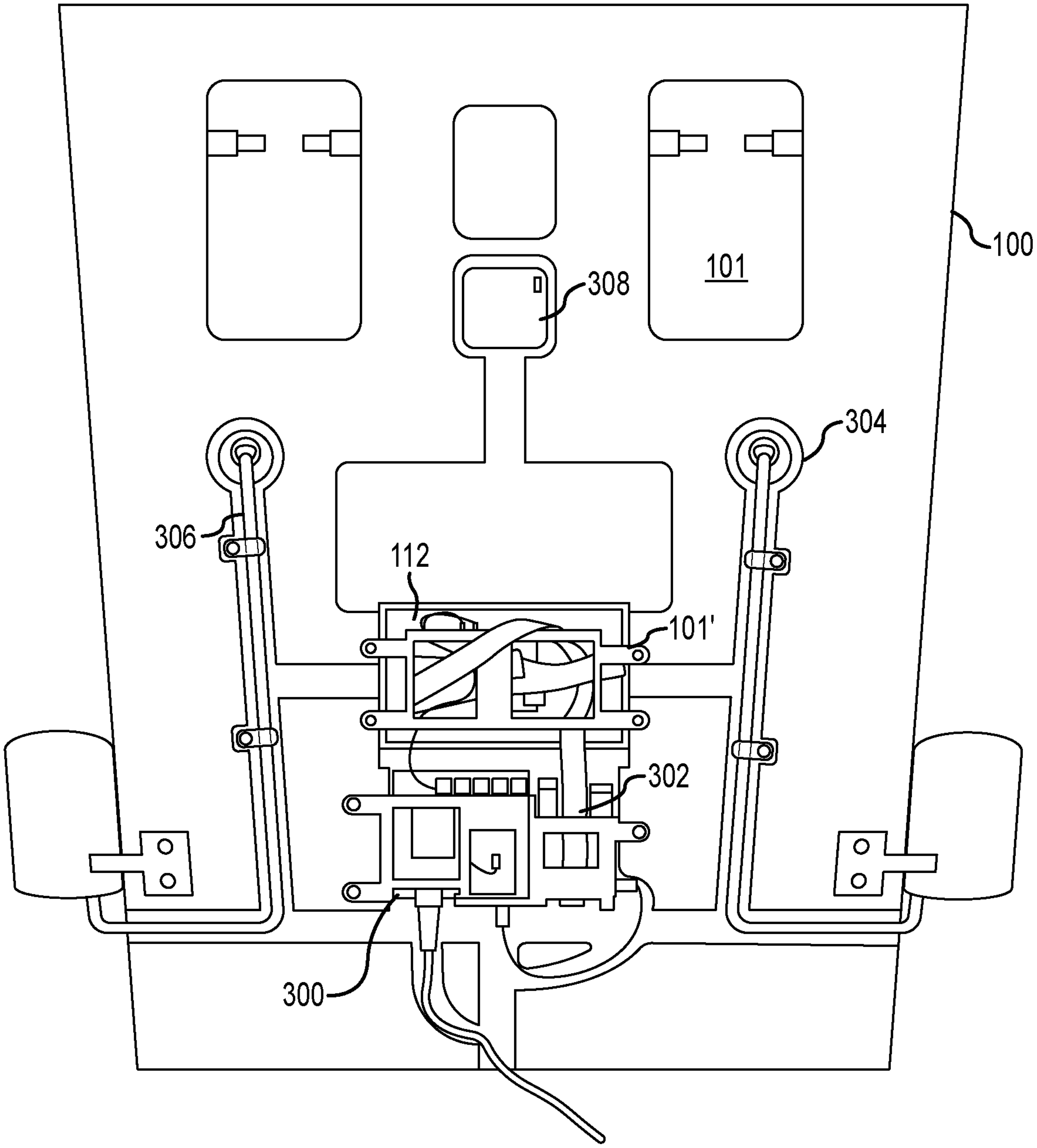
FIG. 3 is a back view of the electronic beverage (wine) tap consistent with the technology of the present application.

FIG. 3 shows a back view of the electronic wine tap 100 consistent with the technology of the present application. The electronic wine tap 100 includes a number of recesses 101 into which parts and components may fit. Providing the recesses 101 allows for the electronic wine tap 100 to be mounted flush to a wall or the like. One or more of the recesses may be completely through the placard 110 of the electronic wine tap 100. If provided with a stand to allow for countertop use, the back of the electronic wine tap 100 may be provided with a cover (not shown) such that the tubes and electronics are not seen. The cover of the back may be decorated similar or different to the artwork on the front of the placard 110. At least one recess, such as recess 101', is a through recess for the GUI 112. The GUI 112 in this exemplary embodiment is a touch screen, but other input/output devices may be provided. The GUI 112 is electrically coupled to a microprocessor 300. In this case, the connection is via a ribbon cable 302, but other connections are possible, both wired and wireless. Note, the recess 101' may be on the front of the placard 110 to receive the GUI 112, which is a touch screen. If the recess 101' is provided on the front of the electronic wine tap 100, one or more electrical conduits (not shown) may be provided to allow the processor to be operatively coupled to the GUI 112. Also, while shown as separate, the processor (described below) may be integrated into the GUI 112 in certain embodiments, similar to an iPAD®, as is available from APPLE, Inc., other tablets, or the like. In the embodiment shown in FIG. 1, the placard 110 has the clock in the display space 128. As can be seen in FIG. 3, the electronics 308 for the clock are accessible from the back of the electronic wine tap 100 to allow for clock controls, etc.

Figure 4:
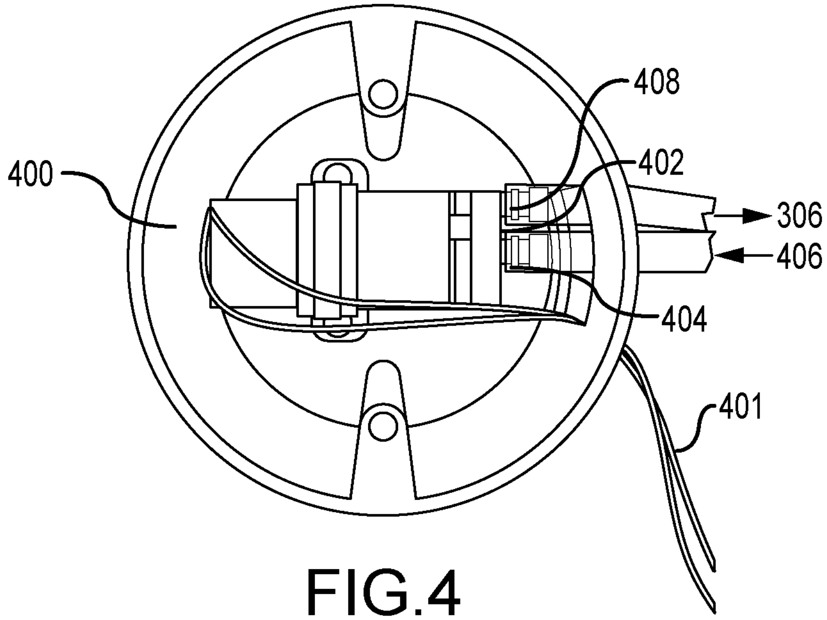
FIG. 4 is a view of a pump for the electronic beverage (wine) tap consistent with the technology of the present application.

The back view of the electronic wine tap 100 includes a bore 304 for each spigot, which in this case is two bores 304 for spigots 108, 114. Tubing 306 places a discharge of a pump 400 (FIG. 4) and the spigots in fluid communication. The pump 400 includes a discharge 402 and an intake 404. The discharge 402 is in fluid communication with the tubing 306. The intake 404 is in fluid communication with tubing 406, that is in fluid communication with the beverage in the beverage container, such as the first, second bottle of wine 105, 119, which will be further explained below. The pump 400, when operating, draws fluid into the intake 404 from the fluid source, which may be a bottle, can, or the like such as a bottle of wine, and discharges the fluid from the discharge 402. In exemplary embodiments, the pump 400 is a parasitic liquid pump, a vacuum pump, or the like. The pump 400 is operationally coupled to the microprocessor 300 by wires 401. The pump 400 may be operationally coupled to receive control signals and power from the microprocessor 300. However, in certain embodiments, the pump 400 may have a separate power supply, such as one or more batteries. Also, the pump 400 in certain embodiments may be operationally coupled to the microprocessor 300 by wireless protocols in certain embodiments. Finally, the pump 400 may include an induction motor to receive power from a power source inductively.

Figure 5:
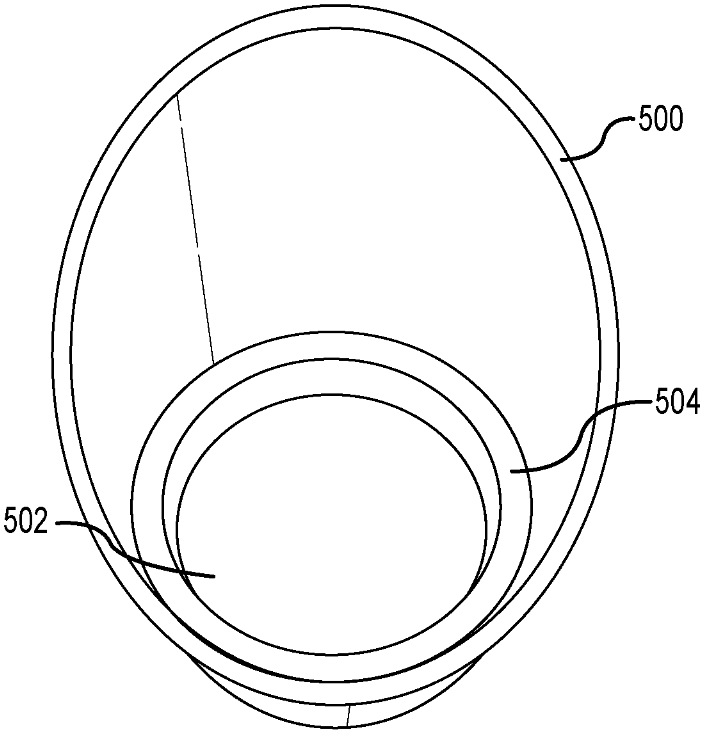
FIG. 5 is a view of a beverage holder consistent with the technology of the present application.

The pump 400 is contained in a housing 408. The housing 408 is provided in this exemplary embodiment such that the housing 408 is shaped to fit within a base 502 of the beverage holder 500, which is generically shown in FIG. 5. The beverage holder 500 may have a bottom 504, such as the foam cushion shown, to hold the bottles (or other container) of the beverage and provide physical separation between the bottle and the pump housing 408. While shown contained in the beverage holder 500, the pump 400, as well as the other components of the pump, may be fitted into a recess in the back of the electronic wine tap 100 similar to other components.

Figure 6A:
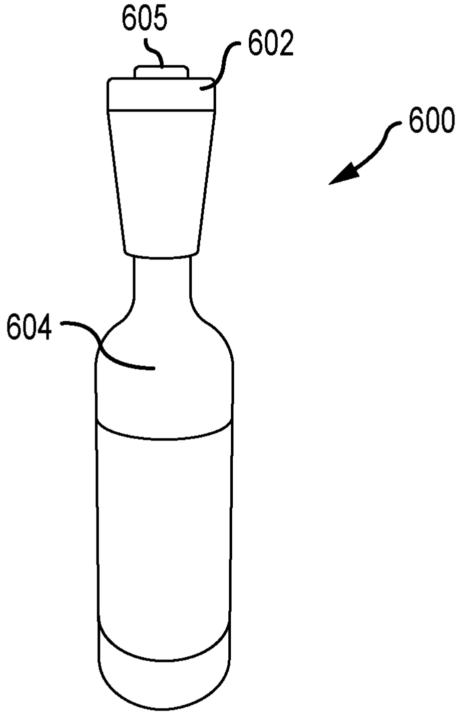
FIG. 6A-6D are view of a beverage with a beverage fastener consistent with the technology of the present application.
Figure 6B:
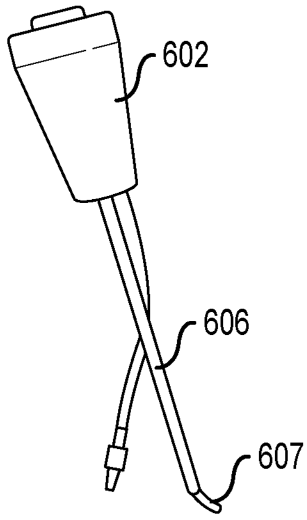

FIGS. 6A-6D show an exemplary beverage fastener 600, which are referred to above as the first and second beverage fasteners 106, 116. The beverage fastener 600 is shown in FIG. 6A as having a cap portion 602 that is operationally coupled to the bottle 604. The cap portion 602 may be coupled to the opening of the bottle 604 by a threaded connection, a friction fit connection, a snap fit connection, or the like. The beverage fastener 600 has a through bore 605 in the cap portion 602 and an intake tube 606 extending to a base of the bottle 604. The cap portion 602 and intake tube 606 may be formed to fit any kind of beverage opening and extend to the bottom of any container. FIG. 6B shows the beverage fastener 600 with the intake tube 606 in isolation. As can be seen, the intake tube 606 may include an elastic tip 607 such that the intake tube 606 may contact the base of the bottle 604 without damaging the bottle or the intake tube 606. The beverage fastener 600 may include a vent (not shown) to allow air intake to the bottle as fluid is removed or the fitting of the beverage fastener 600 may allow sufficient air flow such that a vent is not necessary. The vent or air flow is such to inhibit the forming of a vacuum on the head of the fluid as the pump 400 draws fluid from the bottle.

Figure 6C:
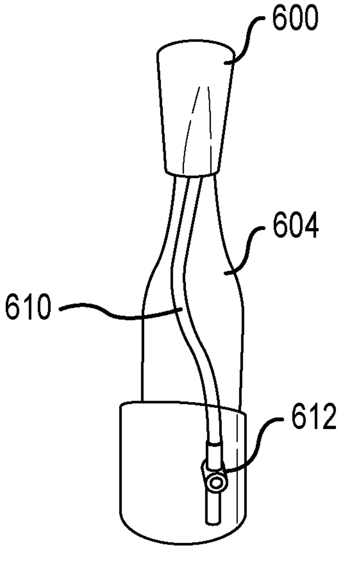
Figure 6D:
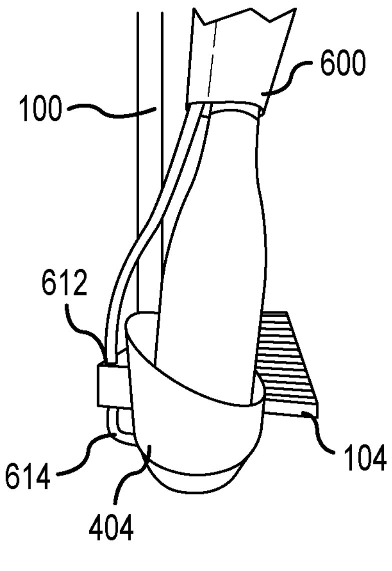

FIG. 6C shows a view of the bottle 604 with the beverage fastener 600 coupled to the opening of the bottle 604. The beverage fastener 600 has tubing 610 in fluid communication with the intake tube 606 (FIG. 6A) and extending from the intake tube 606 to a fastener fitting 612. The fastener fitting 612 is shown as a quick disconnect, but may be any appropriate fitting. As shown in FIG. 6D, the fastener fitting 612 is releasable coupled to a pump fitting 614. The pump fitting 614 is coupled to the tubing 406 to place the intake 404 (FIG. 4) of the pump 400 with the fluid contained in the bottle 604. FIG. 6D further shows the bottle 604 held in the first beverage holder 104 with the tubing 406 extending to the pump intake 404 in the base of the first beverage holder.

Figure 7:
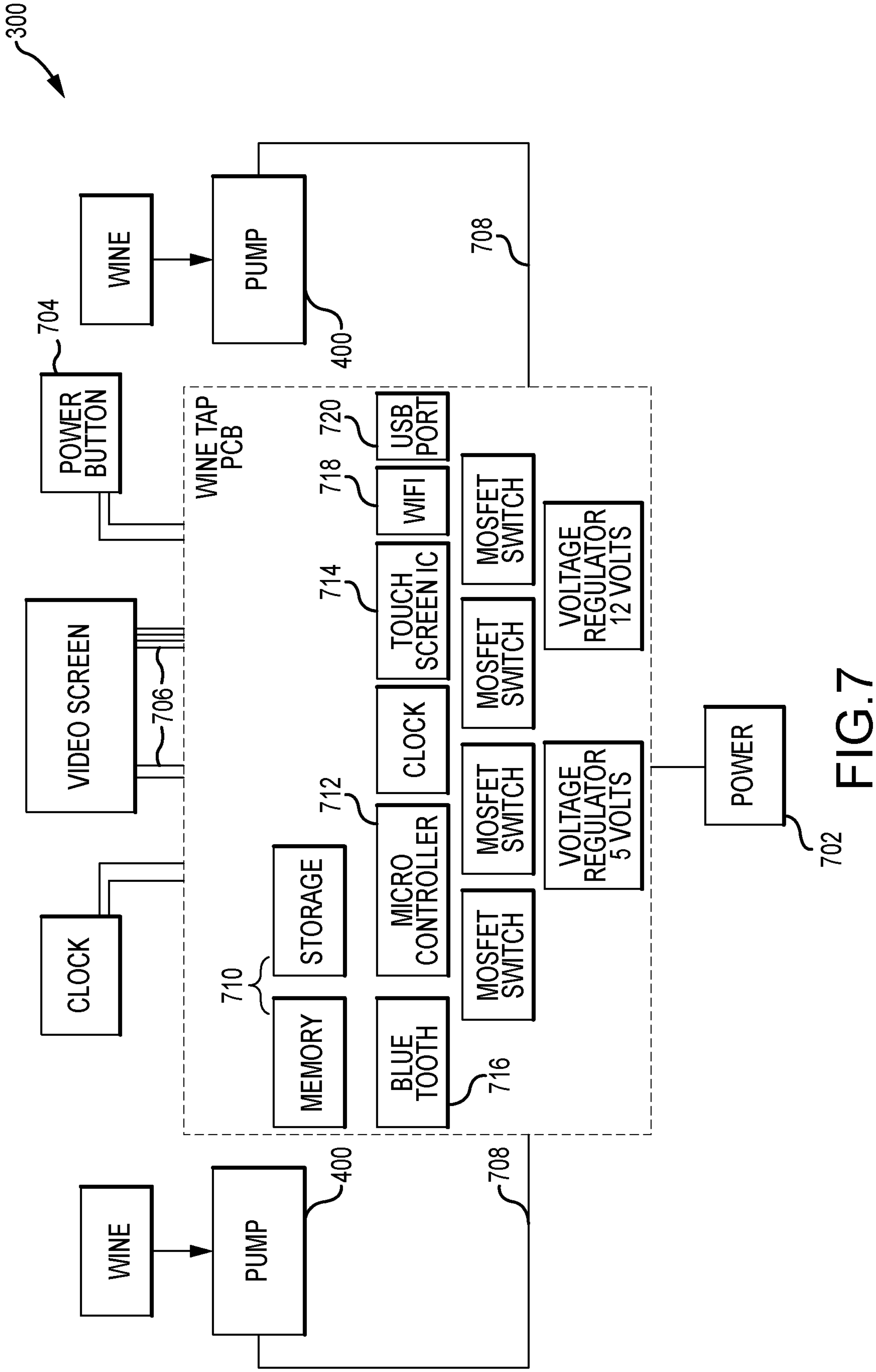
FIG. 7 is a schematic of electronics used with the electronic beverage (wine) tap consistent with the technology of the present application.

FIG. 7 shows a representation of the microprocessor 300 and the various parts/connections. The microprocessor 300 includes, among other things, a power supply 702 and an on/off button 704 (or the like). The microprocessor 300 includes a signal and power connection 706 (or connections 706) to the GUI 112. The signal and power connection 706 supply power to the GUI 112. The microprocessor also comprises signal and power connection 708 to the pump 400 (or pumps 400 in this exemplary embodiment). The microprocessor 300 further includes a memory and storage 710. The memory and storage include programs and data to allow the microprocessor to perform the functions as described herein. The microprocessor 300 also includes a microcontroller 712, a touch screen integrated chip 714, and other components necessary to perform the functions as described herein. Some other components include radio frequency transceivers, such as Bluetooth 716 and WiFi, 718. The microprocessor 300 may also include a access port such as a universal serial port (USB) 720.

Figure 8:
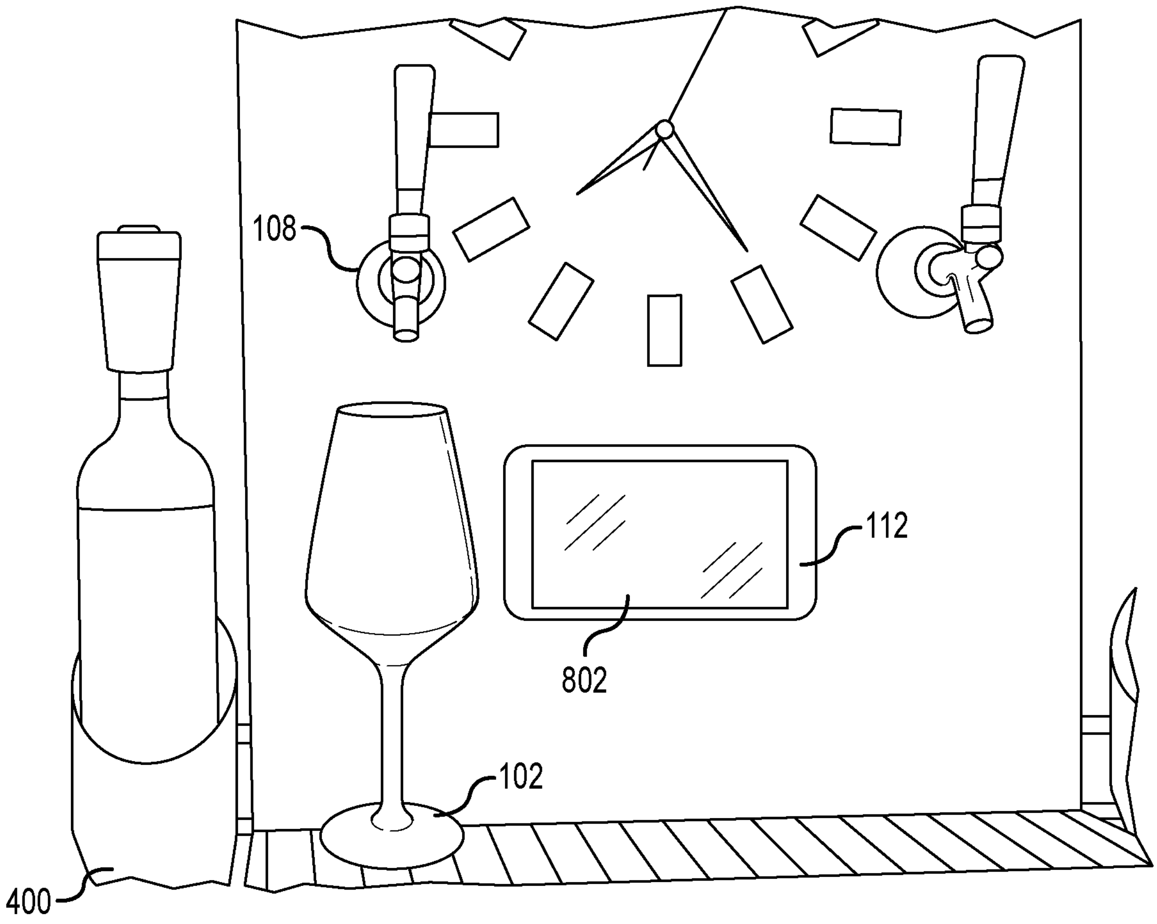
FIG. 8 is a view of the electronic beverage (wine) tap consistent with the technology of the present application.

With reference to FIG. 8, operation of the electronic wine tap 100 will be explained with an exemplary methodology. The methodology is described using specific steps and/or actions. While shown as a series of discrete steps in a particular order, the steps may be performed in other orders or simultaneously. Also, certain of the steps may be combined into a single step and certain of the steps may be broken into addition discrete parts or steps. In any event, the electronic wine tap 100 is turned on, step 1, and the microprocessor 300 causes the GUI 112 to display a menu 802 of beverages, step 2. The GUI 112 shows two (2) choices in this particular embodiment consistent with the example of two wine bottles as described herein. The GUI 112 may be programmed with any number of beverages from 1 or more. Also, each beverage shown may have multiple options, for example, a 6 ounce or a 9 ounce pour. However, for simplicity, a single choice for each of the two beverages is shown. A consumer (operator or user) would place a glass, such as the shown wine glass, on the cup stand 102 and select the associated choice from the menu, step 3. The microprocessor 300 would receive the selection from the input device, which is a touch screen in this exemplary embodiment, step 4. The microprocessor would next cause the pump 400 to turn on, step 5, for a predetermined time. For example, if the pump had a fluid flow of 1 ounce per second, the microprocessor would turn the pump on for 6 seconds to allow for a 6 ounce pour of the selected beverage. After the predetermined time, the microprocessor 300 would send a signal to turn the pump off (or simply remove the on signal), step 6. Optionally, the microprocessor 300 may operate an electronic valve in the spigot to open and close consistent with turning the pump on and off. In certain embodiments, a flow sensor may be provided in the fluid line between the pump discharge and the cup (wine glass) on the cup stand. If a flow sensor is provided, rather than operation of the pump for a predetermined amount of time, the microprocessor may operate the pump until the flow sensor detects a predetermined amount of fluid has passed the sensor, such as, for example, 16 ounces for a pint of beer.

The electronic wine tap 100 of the present technology may allow for tracking of consumption by particular users. For example, in one embodiment, the microprocessor 300 may be provided with user profiles that record when and what beverages the user selects to pour. The user profile may be set up with a unique user identification and password, a Radio Frequency Identification Device (RFID), credit/debit card numbers, or other unique identifiers to link particular users to the user profile stored in the microprocessor 300. The microprocessor 300 may, in certain embodiments, compile a tab for the user by tracking the beverage selection and amount. In certain embodiments, the microprocessor 300 may be configured to allow a certain number of beverage pours or a certain amount of fluid to be dispensed to any particular user. For example, an operator may enter a RFID information to the microprocessor 300 and credit the user profile associated with the RFID a certain number of pours or ounces, such as for a prepaid account. In this instance, the microprocessor 300 would have an input mechanism to receive the RFID transmission, associate the RFID received with the user profile and, if the user has remaining credit on account, may activate the touch screen to allow the user to select a beverage.

Figure 9:
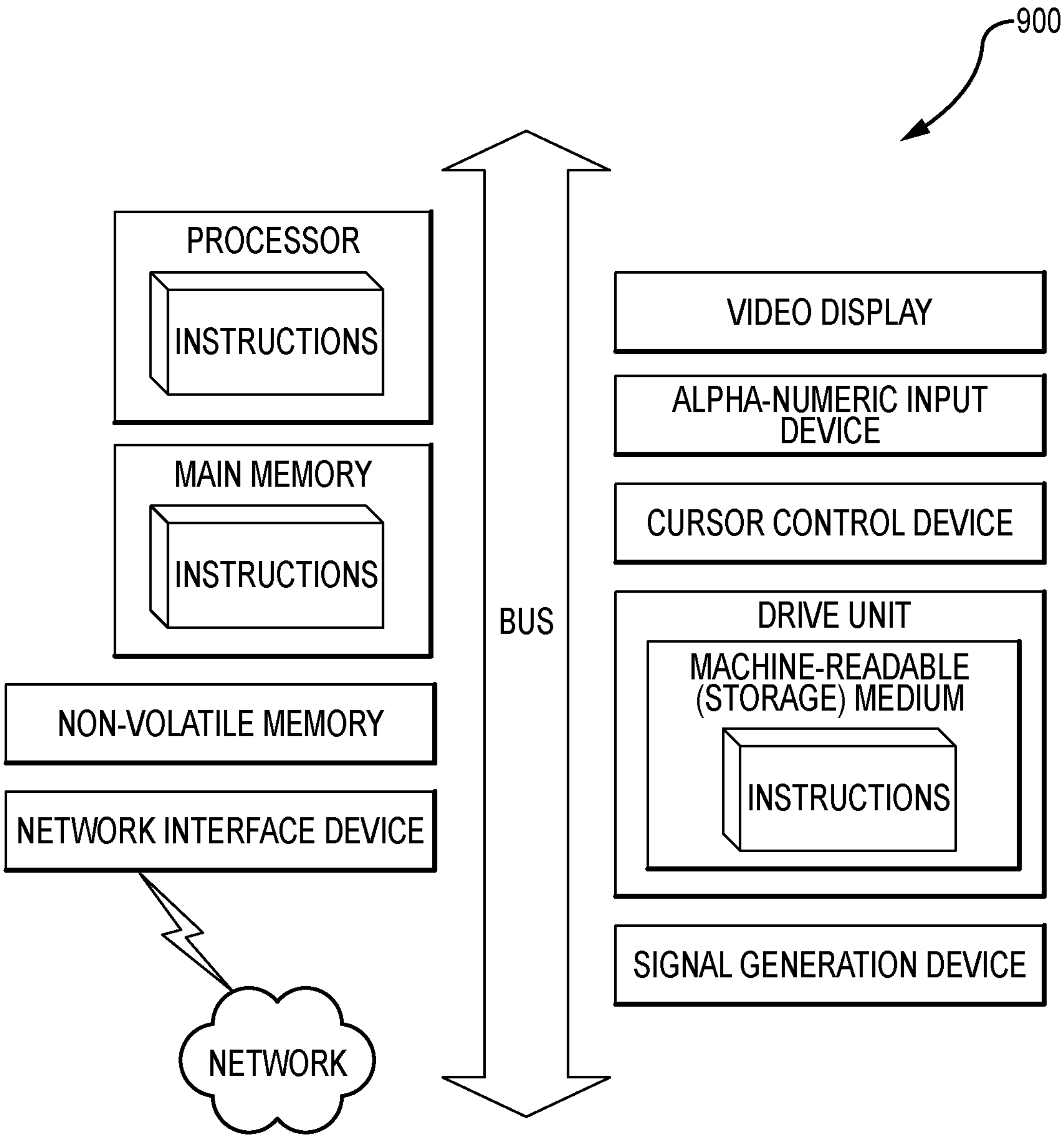
FIG. 9 is a diagram of one or more machines consistent with the technology of the present application.

The technology described herein optionally comprises many networked machines. FIG. 9 depicts a diagrammatic representation of a machine, in the example form, of a computer system within which a set of instructions, for causing the machine to perform any one or more of the methodologies discussed herein, may be executed.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the functions, applications, engines, and scripts are running as described herein and shown in figures (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel microprocessor, Motorola microprocessor, or the like. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually affect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. An electronic, non-pneumatic, beverage dispenser, comprising:

a processor, a graphical user interface having an input device operationally coupled to the processor, the graphical user interface providing at least one beverage selection to a user;

a pump operationally coupled to the processor such that the processor can operationally control the pump, the pump having a fluid intake and a fluid discharge, the fluid intake of the pump configured to be in fluid communication with a beverage source;

a beverage source holder configured to hold a beverage source, wherein the pump is sized to fit into a base of the beverage source holder; and a spigot being in fluid communication with the fluid discharge of the pump, wherein when the user selects the at least one beverage, the processor controls the pump to pump the beverage from the beverage source and out the spigot into a cup.

2. The electronic, non-pneumatic, beverage dispenser of claim 1, comprising a plurality of spigots configured to be in fluid communication with a corresponding plurality of beverage sources.

3. The electronic, non-pneumatic, beverage dispenser of claim 1, comprising:

a placard, the placard having a front side and a back side, wherein the spigot is coupled to the front side of the placard;

a cup stand coupled to the front side of the placard and aligned under the spigot such that a cup may be placed on the cup stand to receive the selected beverage; and the beverage source holder coupled to the front side of the placard, wherein the beverage source holder is configured to hold the beverage source.

4. The electronic, non-pneumatic, beverage dispenser of claim 3, wherein the graphical user interface comprises a screen accessible from the front side of the placard.

5. The electronic, non-pneumatic, beverage dispenser of claim 3, wherein tubing places the discharge of the pump in fluid communication with the spigot and the tubing is contained in the placard and accessible from the back side of the placard.

6. The electronic, non-pneumatic, beverage dispenser of claim 3, wherein the front side of the placard comprises a decorative display.

7. The electronic, non-pneumatic, beverage dispenser of claim 3, comprising a beverage fastener, the beverage fastener being configured to removably couple to an opening of the beverage source.

8. The electronic, non-pneumatic, beverage dispenser of claim 7, wherein the beverage fastener comprises a cap with a bore, a fluid intake tube configured to extend to a bottom of the beverage source, and a fluid tubing placing the fluid intake tube in fluid communication with the pump.

9. The electronic, non-pneumatic, beverage dispenser of claim 8, wherein the fluid tubing and the fluid intake of the pump are coupled using a fitting.

10. The electronic, non-pneumatic, beverage dispenser of claim 1, wherein the spigot comprises an electronic valve and the processor opens the electronic valve when the pump is operating and closes the electronic valve when the pump is not operating.

11. An electronic, non-pneumatic, beverage dispenser comprising:
- a processor,
- a graphical user interface having an input device operationally coupled to the processor, the graphical user interface providing at least one beverage selection to a user;
- a pump operationally coupled to the processor such that the processor can operationally control the pump, the pump having a fluid intake and a fluid discharge, the fluid intake of the pump configured to be in fluid communication with a beverage source;
- a spigot being in fluid communication with the fluid discharge of the pump, wherein when the user selects at least one beverage, the processor controls the pump to pump the beverage from the beverage source and out the spigot into a cup;
- a placard, the placard having a front side and a back side, wherein the spigot is coupled to the front of the placard;
- a cup stand coupled to the front side of the placard and aligned under the spigot such that a cup may be placed on the cup stand to receive the selected beverage; and
- a beverage source holder coupled to the front side of the placard, wherein the beverage source holder is configured to hold the beverage source, wherein the pump is sized to fit into a base of the beverage source holder.

12. The electronic, non-pneumatic, beverage dispenser of claim 1, wherein the processor is coupled to the pump wirelessly.

13. The electronic, non-pneumatic, beverage dispenser of claim 1, comprising a wall mounting.

14. The electronic, non-pneumatic, beverage dispenser of claim 13, wherein the wall mounting comprises a pivotable arm to allow the graphical user interface to be positioned for a user.

15. A method of dispersing at least one beverage from an electronic, non-pneumatic, beverage dispenser, the method comprising:
- providing an electronic, non-pneumatic, beverage dispenser comprising a placard having a beverage source, a cup stand, a spigot arranged over the cup stand, a pump, a microprocessor, and a graphical user interface configured to allow a user to select a beverage to be dispensed;
- displaying, by the processor, a selection of beverages to a user on the graphical user interface;
- receiving, by the processor, a selected beverage out of the selection of beverages from the graphical user interface;
- signaling, by the processor, the pump to pump the selected beverage from the selected beverage source based on the selected beverage in the beverage holder such that the pump pumps the beverage from the beverage source to pour out of the spigot and opening a valve in the spigot when the pump is started and closing the valve in the spigot when the pump is stopped.

16. The method of claim 15, wherein the step of receiving comprises receiving a size of the beverage and the signaling causes the pump to pump the selected beverage until the size of beverage is reached.

17. The method of claim 16, comprising placing a cup on the cup stand.

18. The method of claim 15, wherein signaling, by the processor, the pump to pump fluid comprises starting the pump at a first time and stopping the pump at a second time.

19. An electronic, non-pneumatic, beverage dispenser comprising:
- a placard having a front and a back, the placard configured to be wall mounted;
- a plurality of spigots coupled to and extending from the front of the placard;
- a cup stand coupled to the placard and arranged below the plurality of spigots, wherein the cup stand is sized to accommodate a cup for each of the plurality of spigots;
- a plurality of beverage holders corresponding to the plurality of spigots, wherein each of the plurality of beverage holders is configured to hold a beverage;
- a plurality of pumps corresponding to the plurality of spigots, wherein each of the plurality of pumps is configured to place one of the beverages in fluid communication with one of the spigots;
- at least one graphical user interface displaying a plurality of beverage selections corresponding to the plurality of beverage holders holding a beverage; and
- a processor operationally coupled to the at least one graphical user interface and the plurality of pumps to cause the pumps to cause the beverages to be poured out of the spigots.

20. The electronic, non-pneumatic, beverage dispenser of claim 19, wherein the placard has one or more recesses in the back to receive at least the processor.

21. The electronic, non-pneumatic, beverage dispenser of claim 20, wherein the placard is configured to be wall mounted such that the placard is flush with a wall.

22. The electronic, non-pneumatic, beverage dispenser of claim 21, wherein at least one of the one or more recesses in the back is completely through the placard.

23. The electronic, non-pneumatic, beverage dispenser of claim 19, wherein the plurality of beverage holders is arranged below the placard.

24. The electronic, non-pneumatic, beverage dispenser of claim 19, wherein the plurality of beverage holders are coupled to the placard.

25. An electronic, non-pneumatic, beverage dispenser, comprising:
- a processor,
- a graphical user interface having an input device operationally coupled to the processor, the graphical user interface providing at least one beverage selection to a user;
- a pump operationally coupled to the processor such that the processor can operationally control the pump, the pump having a fluid intake and a fluid discharge, the fluid intake of the pump configured to be in fluid communication with a beverage source;
- a spigot being in fluid communication with the fluid discharge of the pump, wherein when the user selects the at least one beverage, the processor controls the pump to pump the beverage from the beverage source and out the spigot into a cup; and
- a valve operationally coupled to the processor such that the processor operationally opens and closes the valve when the pump is operationally controlled to pump.

26. An electronic, non-pneumatic, beverage dispenser comprising:
- a placard having a front and a back wherein the back of the placard has at least one recess, the placard being configured to be mounted flush with a wall;

a plurality of spigots coupled to and extending from the front of the placard;

a cup stand coupled to the placard and arranged below the plurality of spigots, wherein the cup stand is sized to accommodate a cup for each of the plurality of spigots;

a plurality of pumps corresponding to the plurality of spigots, wherein each of the plurality of pumps is configured to place one of a plurality of beverages in fluid communication with one of the spigots;

at least one graphical user interface displaying a plurality of beverage selections corresponding to the plurality of beverages; and a processor in the at least one recess and operationally coupled to the at least one graphical user interface and the plurality of pumps to cause the pumps to cause the beverages to be poured out of the spigots.

27. The electronic, non-pneumatic, beverage dispenser of claim 26 comprising a plurality of beverage holders corresponding to the plurality of beverages.

28. The electronic, non-pneumatic, beverage dispenser of claim 27, wherein the plurality of beverage holders are coupled to the placard.

29. The electronic, non-pneumatic, beverage dispenser of claim 26, wherein the plurality of beverages are remote from the placard.

* * * * *